Jan. 31, 1956  V. HACKWORTH  2,732,918
BRAKE MASTER CYLINDER ASSEMBLY
Filed Nov. 3, 1950  3 Sheets-Sheet 2
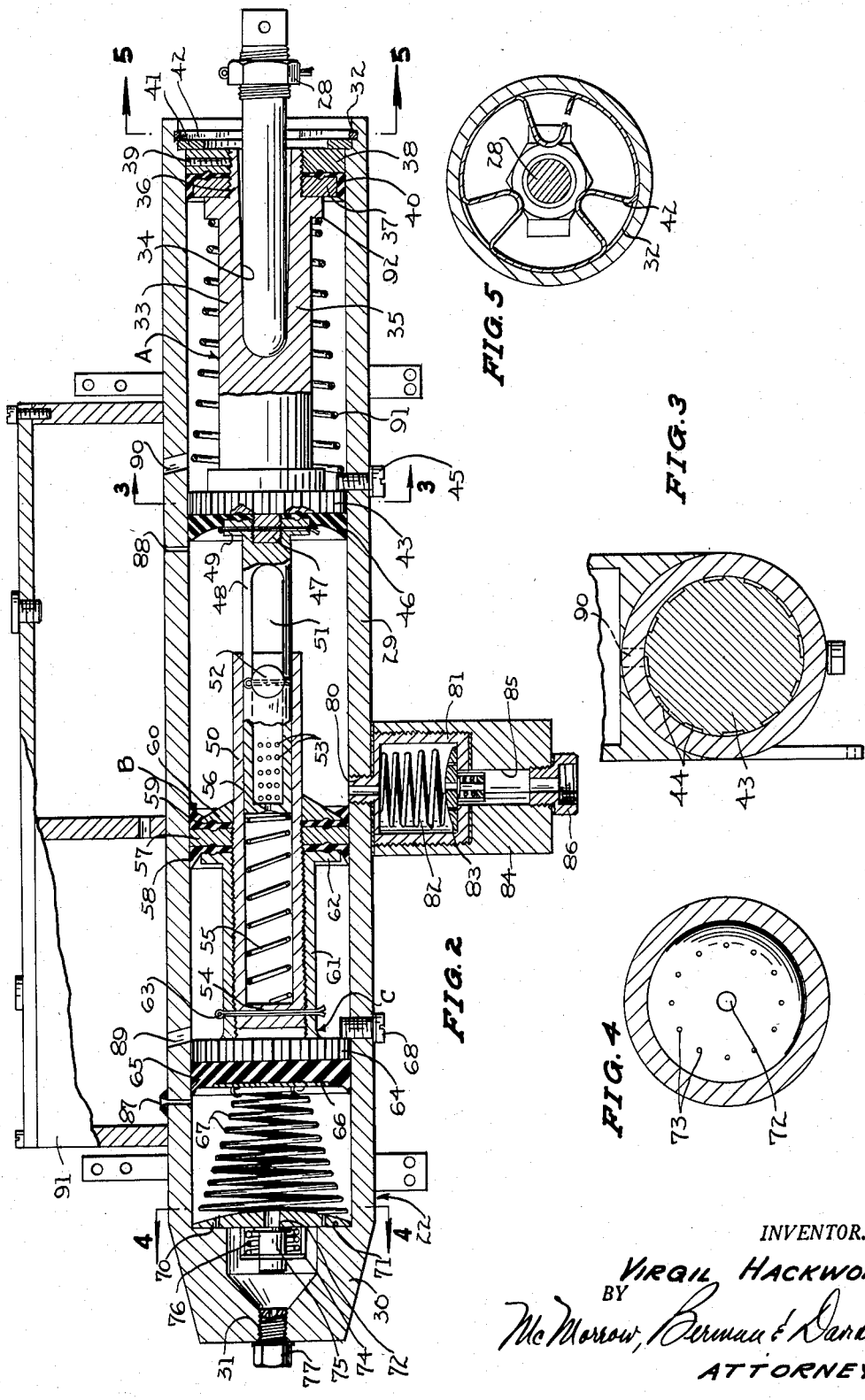
INVENTOR.
VIRGIL HACKWORTH
BY
ATTORNEYS Jan. 31, 1956  V. HACKWORTH  2,732,918
BRAKE MASTER CYLINDER ASSEMBLY
Filed Nov. 3, 1950  3 Sheets-Sheet 3
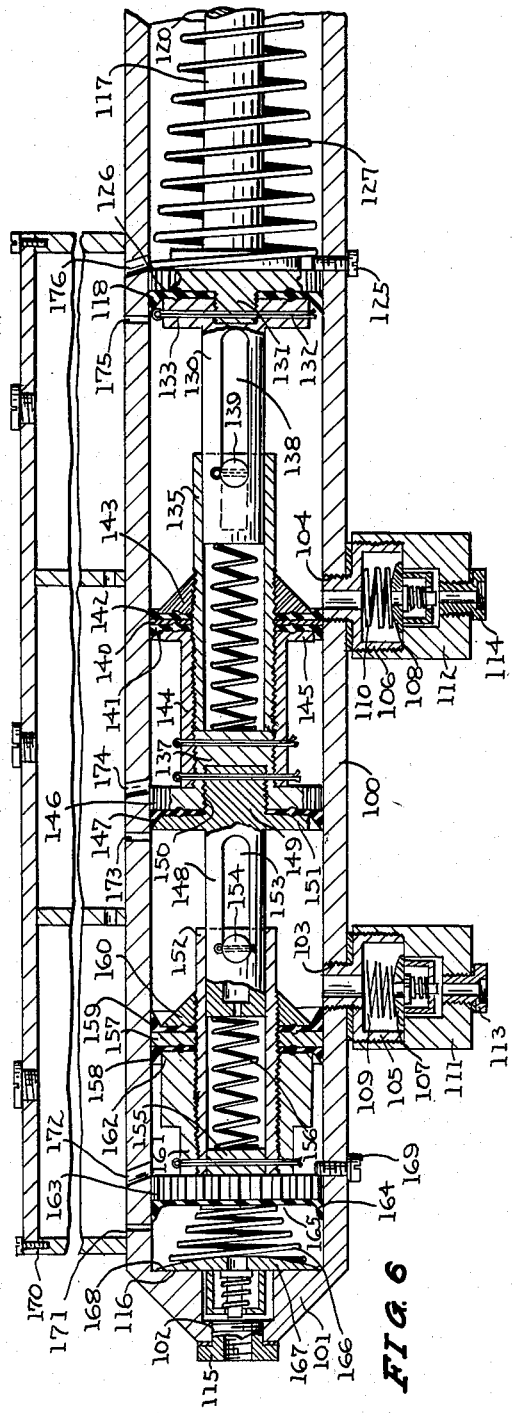
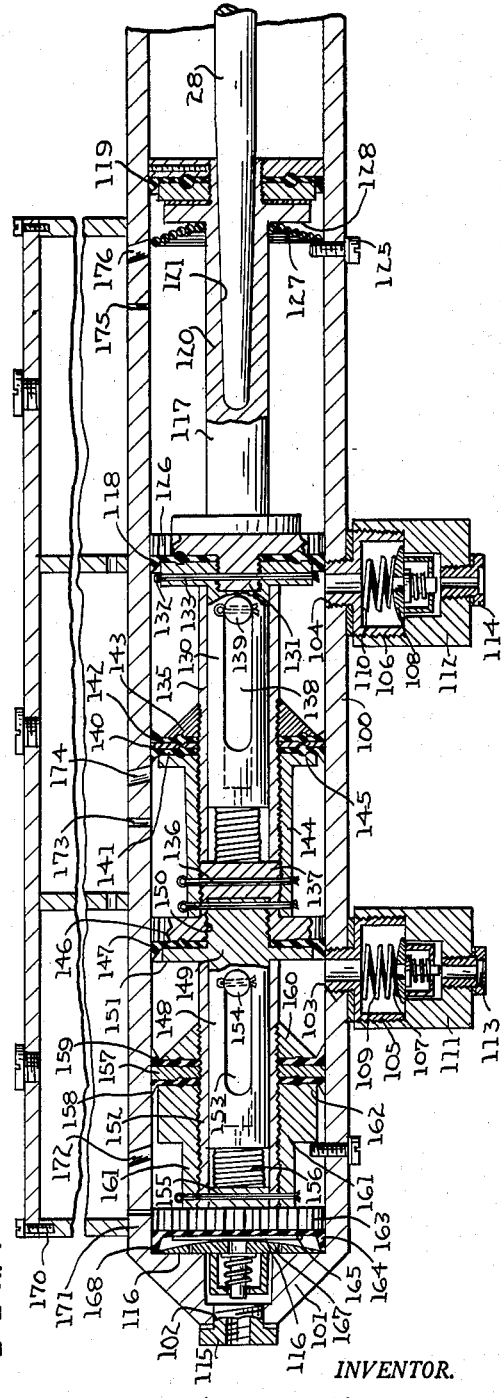
INVENTOR.
VIRGIL HACKWORTH
BY
ATTORNEYS

United States Patent Office 2,732,918
Patented Jan. 31, 1956

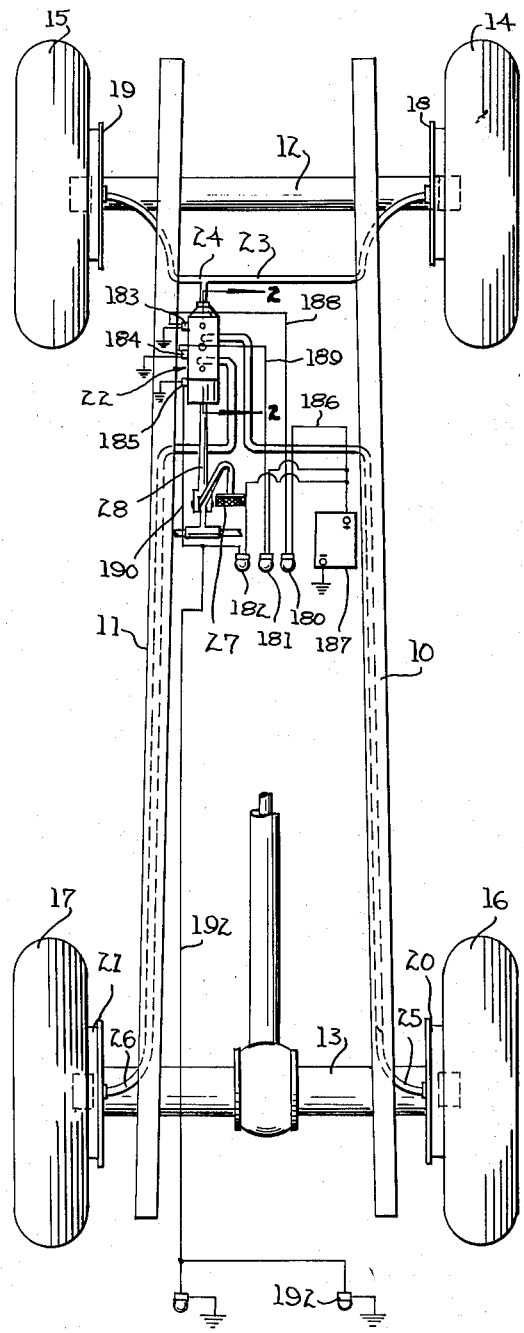

2,732,918
BRAKE MASTER CYLINDER ASSEMBLY
Virgil Hackworth, Riceville, Ky.

Application November 3, 1950, Serial No. 193,930

4 Claims. (Cl. 188—152)

This invention relates to brake master cylinder assemblies and more particularly to a master cylinder assembly for actuating different wheel brakes of a vehicle with individual and separate bodies of hydraulic fluid.

An object of the invention is to provide a brake master cylinder assembly which is effective either to simultaneously apply all four brakes of an automobile vehicle with the same pressure or to apply the front brakes effectively if one or both of the rear brakes is defective, to apply the rear brakes if one or both of the front brakes is defective, or to apply the front brakes and one rear brake, if the only defective brake is the other rear brake.

Another object of the invention is to provide a brake master cylinder assembly which is equipped with signal lights or other signals visible to the operator of the vehicle to indicate which of the vehicle brakes are out of service.

A further object of the invention is to provide a master brake cylinder assembly which, while effective to apply one rear brake if the other rear brake is defective, precludes application at any time of only one front brake, thus avoiding the danger of pulling the vehicle off the road by the application of only one front brake.

A still further object of the invention is to provide a brake master cylinder assembly which is simple and durable in construction, economical to manufacture, easy to install, and positive and effective in operation.

Other objects and advantages will become apparent from a consideration of the following description and the appended claims in conjunction with the accompanying drawings wherein:

Figure 1 is a top plan view of an automotive vehicle chassis showing the application of a brake master cylinder assembly and signal light means illustrative of the invention thereto;

Figure 2 is a cross sectional view on an enlarged scale of the brake master cylinder assembly taken on the line 2—2 of Figure 1;

Figure 3 is a transverse cross sectional view of a piston component of the assembly and is taken substantially on the line 3—3 of Figure 2;

Figure 4 is a transverse cross sectional view on the line 4—4 of Figure 2;

Figure 5 is a transverse cross sectional view on the line 5—5 of Figure 2;

Figure 6 is a longitudinal cross sectional view similar to Figure 2 showing a somewhat modified form of brake cylinder assembly; and Figure 7 is a view similar to Figure 6 but showing the parts in a different operative position from that illustrated in Figure 6.

With continued reference to the drawings, the vehicle chassis frame illustrated in Figure 1 includes longitudinal side members 10 and 11 and this frame is supported by suitable springs in a well known manner on a front suspension or axle 12 and a rear axle 13. Front wheels 14 and 15 are journaled on the front suspension 12 to support the front end of the frame and rear wheels 16 and 17 are journaled on the respectively opposite ends of the rear axle.

The front wheels 14 and 15 are provided with hydraulic brake assemblies 18 and 19, respectively, of well known construction, and the rear wheels 16 and 17 are provided with similar brake assemblies 20 and 21, respectively. A brake master cylinder, generally indicated at 22, is mounted on the chassis frame adjacent to the left-hand frame side member 11 and the front suspension 12, the front end of the cylinder 22 being connected by means of a T fitting 24 to a conduit 23 which connects the front wheel brakes 18 and 19 together. The rear wheel brakes 20 and 21 are connected to the brake master cylinder 22 by conduits 25 and 26 which may be separately connected to the master cylinder at spaced apart points located intermediate the ends of the cylinder or may be connected together before being connected to the master cylinder. A brake pedal 27 is mounted on the chassis frame and is operatively connected to the brake master cylinder by a piston rod 28 having at its end connected to the brake pedal a fork receiving the brake pedal and a pivot pin extending through registering apertures in the legs of the fork and the brake pedal. At its opposite or forward end the piston rod 18 extends into the rear end of the master cylinder and is connected with the master cylinder mechanism in a manner presently to be described.

In the form of the invention illustrated in Figure 2 the master cylinder assembly 22 comprises an elongated tubular cylinder 29 having its forward end closed by an end wall 30 provided with a central, screw threaded aperture 31, the rear end of the cylinder being open and provided with an internal annular groove 32.

A double-ended rear or first piston A is slidably disposed in the cylinder 29 near the rear end of the cylinder and comprises an elongated solid body 33 having an inwardly tapered axial socket 34 into which the piston rod 28 extends through the open end of the cylinder.

The piston A includes an intermediate body portion 35 of elongated, cylindrical shape having a diameter materially less than the inside diameter of the bore of the cylinder 29 and having on one end a coaxial tubular boss 36 surrounding the socket 34. Two annular collars 37 and 38 are threaded on the boss 36 and secured thereon by suitable means, such as set screws 39 threaded through tapped, radially extending holes in the outer collar 38. A piston cup 40 of flexible material has a web portion disposed between the collars 37 and 38 and a flange portion peripherally surrounding the inner collar 37 to provide a fluid tight seal between the corresponding end of the piston 33 and the cylinder 29.

An annular stop ring 41 is disposed in an annular internal recess in the open end of the cylinder 29 and is secured in position therein by a snap ring 42 seated in the annular groove 32 to prevent the piston 33 from projecting out of the open end of the cylinder 29.

At is forward end the piston A is provided with a disc shaped head 43 the periphery of which is provided with angularly spaced apart, transverse grooves 44 to provide fluid passages of limited cross-section between the periphery of the head 43 and the side wall of the cylinder 29.

Set screws 45 are threaded through corresponding tapped holes in the side walls of the cylinder 29 to be engaged by the rearward side of the piston head 43 to limit rearward movement of the piston A and to constitute an abutment for the front end of a compression spring 91 which surrounds the piston and bears at its rear end against an annular shoulder 92 on the piston near the rear end of the latter. This spring resiliently urges the piston assembly rearwardly in the cylinder and is effective to independently retract the piston assembly in the event of breakage of spring 67.

A cup 46 of suitable resilient material, such as vulcanized rubber, is placed against the forward end of piston head 43 to provide a fluid tight seal between the head 43 and the side wall of the cylinder. An externally screw threaded boss 47 extends coaxially from the piston head 43 through the center of this cup.

A hollow cylindrical stem 48 is provided in one end with a screw threaded recess receiving the boss 47 and at the same end with an annular enlargement or head 49 which bears against the cup 46 and compresses the cup against the piston head 43. A forward end portion of the stem portion 48 extends into the adjacent end of a tubular spring housing 50. The stem 48 is provided intermediate its length with a slot 51 extending longitudinally thereof. A pin 52 extends through registering apertures in the spring housing 50 and through the slot 51 in the stem 48 to limit sliding movement of the stem relative to the housing, and the end portion of the stem 48 within the housing 50 is provided with a plurality of small holes 53 for supplying lubricant from the interior of the cylinder 29 to the bearing surfaces between the stem and the housing 50. The end of the housing 50 remote from the stem 48 is closed by an end wall 54 and a compression spring 55 in the housing is composed between the end wall 54 and the adjacent end of the stem 48 and acts to resiliently urge the stem rearwardly out of the spring housing. The closed forward end 56 of the stem has a small fluid passage 56' to vent the space within the housing 50 forward of the stem 48.

The spring housing 50 is externally screw threaded and a collar 57 is threaded onto this housing and positioned substantially at the mid-length point of the housing. Piston cups 58 and 59 of resilient material surround the housing at respectively opposite sides of the collar 57, and a compression nut 60 is threaded onto the housing and bears against the rear side of the rear cup 59 to compress this cup between itself and the collar 57 thereby constituting a second or intermediate piston B. An elongated tubular sleeve 61 is threaded on the forward end portion of the spring housing 50 and has on its rear end an annular flange 62 which bears against the front side of the front cup 58 so as to compress this cup between the flange 62 and the collar 57. A pin or cotter key 63 extends through registering apertures in the sleeve 61 and housing 50 to hold the sleeve against rotational movements relative to the housing after the sleeve has been threaded onto the housing.

A forward or third piston C comprises a piston head 64 having a transversely grooved periphery is provided on the front end of the sleeve 61 and a piston cup 65 of resilient material bears against the front face of the piston head 64. A pressure plate 66 bears against the front face of the cup 65 and a compression spring 67 is compressd between this pressure plate and a check valve body bearing against the front end wall 29 of the cylinder 29 to hold the cup 65 firmly against the piston head 64.

Set screws 68 are threaded through tapped holes in the cylinder 29 behind the piston head 64 to limit rearward movement of the piston head and cup 66 away from the closed front end of the cylinder.

A check valve body 70 of flexible material is disposed between an annular shoulder 71 on the closed end 30 of the cylinder 29 and the adjacent end of spring 67 and has a convex rear face facing the spring 67. This check valve body is disc shaped and is provided with a central aperture 72 and a circular series of spaced apart small holes 73 concentrically surrounding the central aperture 72 and overlying the annular shoulder 71. A cage 74 is secured to the front side of the valve disc 70 overlying the central aperture 72 and a valve plunger 75 is mounted in this cage and is urged into closing relationship with the aperture 72 by a compression spring 76 acting between the cage and the plunger valve.

The check valve serves to retain fluid in the master cylinder 29 until sufficient pressure is imposed on the fluid to force fluid through the check valve so that leakage of the fluid present in the master cylinder to the brake lines when the brakes are not being used is prevented while full return of the fluid from the brakes to the master cylinder is provided for.

A conduit connecting fitting 77 is threaded into the aperture 31 in the front end 30 of the cylinder 29 for connecting the front end of the cylinder to the front brake conduit 23.

With this arrangement, when the cylinder head 64 and washer or cup 65 are forced forwardly toward the closed end of the cylinder the brake fluid in the space between this piston and the closed end of the cylinder is forced through the check valve provided by the valve disc 70 and plunger 75 and out of the cylinder through the fitting 77 into the conduit 23 to operate the front brakes of the vehicle. When brake actuating pressure of the piston 64, 65 is released, compression spring 67 resiliently urges this piston away from the closed end of the cylinder to its rearward limiting position against the stop screws 68.

The position of the intermediate piston comprising the collar 57 and washers or cups 58 and 59 is determined by contact of the piston head 64 with the stop screws 68. A screw threaded aperture 80 is provided in the side wall of the cylinder 29 at the rear side of the intermediate piston B.

A hollow check valve housing 81 is secured to the cylinder 29 and is provided with a screw threaded tubular boss threaded into the aperture 80. A check valve assembly similar to the check valve assembly at the closed end of the cylinder 29, as described above, is provided in the outer end of the valve body 81, a compression spring 82 being interposed between the inner end of the valve body and the check valve disc 83 at the outer end of the valve body. A hollow casing 84 is threaded onto the externally screw threaded external surface of the valve body 81 and is provided with a bore 85 communicating at its inner end and with the interior of the check valve body and the hole in the valve disc 83. A conduit connecting fitting 86 is threaded into the outer end of the bore 85 for connection to the conduits 25 and 26 carrying brake fluid to the rear brakes of the vehicle.

The side wall of the cylinder 29 is provided with additional holes 87, 88, 89 and 90, providing limited communication between the interior of the cylinder 29 and the interior of a brake fluid reservoir 91 mounted on the cylinder.

The hole 87 is located adjacent to the forward side of the cup 65 and maintains the chamber between this cup and the closed end 30 of the cylinder filled with hydraulic fluid. The hole 88 is located at the forward side of the cup 46 and maintains the chamber between this intermediate piston cup and the cup 59 filled with hydraulic fluid, this latter chamber being the rear brake operating chamber of the master cylinder. The hole 89 leads from the interior of the reservoir 91 into the space between the piston head 64 and the cup 58 of the intermediate piston B to provide a fluid breather for this space, and the hole 90 leads from the fluid reservoir into the space between the heads of the first or rear piston A to provide a fluid breather for this space.

The operation of the above-described master cylinder assembly is substantially as follows:

When foot pressure is applied to the foot pedal 27 the rear double piston A is forced forwardly in the cylinder 29 against the resistance of the return spring 91, closes the hole 88, and compresses the fluid in the space between its cup 46 and the cups 59 of the intermediate piston B, moves the intermediate piston B forwardly, assisted by the compression spring 55.

Forward movement of the piston 57 acting through the sleeve 61 moves the piston head 64 and cup 66 forwardly, closes the hole 87 and compresses the hydraulic fluid in the space between the forward piston C and the closed end 30 of the cylinder 29. Compression of fluid in this last mentioned space applies the front brakes of the vehicle and also provides a resistance to forward movement of the front head 64 of the intermediate piston B piston 57 whereby the compression of the fluid in the space between the cups 46 and 59 is increased so that it is forced to flow through the valve housing 81 and the check valve body 83 to the fitting 86 from which it flows through the conduits 25 and 26 and applies the rear brakes of the vehicle. The pressure of the fluid applied to the front and rear brakes of the vehicle will be substantially the same under these conditions.

If, for any reason, such as a leak in the conduit 23 or a blown out wheel cylinder in one of the front wheel brakes, pressure fails to build up in the chamber between the forward piston cup 65 and the closed forward end of the cylinder 29, the forward piston head 64 and cup 65 will move forwardly until annular flange 62 engages the set screws 68 whereby further forward movement of the intermediate piston B is arrested. Piston A will then move forwardly toward intermediate piston B against the resistance of the spring 55 and thereby build up the necessary fluid pressure in the space between its cup 46 and the intermediate piston cup 59 to apply the rear brakes.

Under these conditions, the rear brakes only of the vehicle will be applied, but the driver of the vehicle will have the use of at least the rear brakes and will not be without brakes as in the case when a leak develops in an existing hydraulic brake system.

If, on the other hand, the front brakes are operative and the rear brakes are defective, so that pressure fails to build up in the rear brake-applying space between the rear piston cup 46 and the intermediate piston cups 59, the stem 48 will be moved forwardly into the spring housing 50 by forward movement of the rear piston against the resistance of the spring 55 until sufficient forward pressure is applied to the forward piston cup 65, and move the forward piston forwardly so as to compress the fluid in the space between the cup 65 and the closed end 30 of the cylinder to apply the front wheel brakes of the vehicle.

The check valves restrain the flow of fluid from the brake cylinder to the brakes until a predetermined fluid pressure has been built up in the brake cylinder, but permit free return of the fluid from the brakes into the brake cylinder when the brakes are released.

The pistons in the brake cylinder are normally returned to their brake releasing positions by the two compression springs 91 and 67. However, should either of these springs break during operation, the other spring will still act to return the pistons to their releasing positions to allow the vehicle brakes to release. The transverse grooves in the peripheries of the two piston heads 43 and 64 provide for a flow of brake fluid to and away from the corresponding cups 46 and 65 to maintain the peripheral surfaces of these cups lubricated and to provide for the escape of fluid from between the adjacent surfaces of the cups and the associated piston heads.

In the modified form of the device illustrated in Figures 6 and 7, the cylinder is indicated at 100 and has one end open and the other end closed by an end wall 101 provided with a central aperture 102. The cylinder is provided with screw threaded apertures 103 and 104 spaced apart lengthwise of the cylinder and hollow valve housings 105 and 106 are provided with hollow, screw threaded bosses threaded respectively into the apertures 103 and 104. Check valve assemblies 107 and 108 are mounted in the housings 105 and 106 respectively and urged to seat engaging position by the corresponding compression springs 109 and 110 disposed in the housings. Covers 111 and 112 are threaded onto the externally screw threaded valve housings and provided each with a screw threaded aperture and conduit fittings 113 and 114 are secured in the apertures of the covers 111 and 112 and communicate with the interiors of the corresponding valve housings 105 and 106 through the corresponding check or flap valves 107 and 108. A conduit fitting 115 is threaded into the aperture 102 in the end wall of the cylinder and a flap or check valve assembly 116 is disposed in the cylinder against the end wall thereof for controlling the flow of hydraulic fluid to the fitting 115.

The fitting 115 is connected by a suitable conduit assembly, such as the assembly 23 of Figure 1, with both of the front wheel brakes of the vehicle and the fittings 113 and 114 are respectively connected with the rear wheel brakes by the separate conduits 25 and 26 so that both front wheel brakes are simultaneously operated while the two rear wheel brakes are independently operated by the master cylinder assembly.

A double ended piston 117, similar in all respects to the double ended piston 33 illustrated in Figure 2 and described above, is slidably mounted in the cylinder 100 near the closed end of the latter and carries two resilient washers or cups 118 and 119 disposed at the front and rear ends of the piston respectively and slidably engaging the inner surface of the cylinder 100. The piston includes an intermediate body portion 120 of smaller diameter than the internal diameter of the cylinder and this body portion is provided with a longitudinally extending bore or recess 121 constituting a socket for the forward end of the actuating pin 28.

A stop washer, not illustrated, is secured in the open end of the cylinder by a snap ring received in an internal annular groove in the cylinder to prevent movement of the piston out of the open end of the cylinder. Stop screws 125 are threaded through tapped holes in the cylinder and engage the rear face of the front piston head 126 when the piston is in its rearward or fully retracted position to provide an additional stop for movement of this piston in a brake releasing direction and a coiled retracting spring 127 surrounds the intermediate portion 120 of the piston 117 and bears at its forward end against the inner ends of the stop screws 125. The rear end of this spring bears against an annular shoulder 128 provided by an annular enlargement near the rear end of the intermediate portion of the piston and this spring resiliently urges the piston 117 in a brake releasing direction toward the open end of the cylinder 100.

A hollow cylindrical stem 130 is secured to the front end of the piston 117 by means of a screw threaded boss 131 threaded into a screw threaded recess in one end of the stem, the stem being held against rotation relative to the front piston head 126 by a through pin or cotter key 132 extending through registering diametrical apertures in the boss 131 and the adjacent end of the stem 130. This end of the stem 130 is provided with an annular enlargement 133 which bears against the adjacent face of the resilient cup 118 to compress the cup between the head or enlargement 133 of the stem and the adjacent surface of the front head 126 of the piston 117.

A first tubular spring housing 135 slidably receives at one end the end of the stem 130 remote from the piston head 126 and a compression spring 136 is disposed in the housing 135 between the adjacent closed end of the stem 130 and the end of a screw plug 137 which closes the other end of the housing 135. The stem 130 is provided with a longitudinally extending slot 138 and the housing 135 is provided with diametrically opposed apertures in alignment with the slot 138. A pin extends through the apertures in the housing 135 and slot 138 in the stem 130 and provides a lost motion connection between the stem and the housing.

The housing 135 is externally screw threaded and an annular collar or piston 140 is threaded onto the housing and located substantially midway the length of the housing. Cups or washers 141 and 142 of resilient material surround the housing 135 at the front and rear sides of the piston 140 respectively, and the cup 142 is compressed against the rear side of the piston by a nut 143 threaded onto the housing 135 and bearing against the rear or outer face of the cup 142.

A first sleeve 144 is threaded onto the housing 135 at the side of the piston 140 remote from the piston 117 and has an annular enlargement or head 145 on its end adjacent the piston 140 which head bears against the front or outer side of the resilient cup 141 to compress this cup between the first sleeves 144 and the piston 140. The screw plug 137 is threaded into the front end of the sleeve 144 remote from the piston 140 and bears against the adjacent end of the spring housing 135. This screw plug has on its end remote from the piston 140 a piston head 146 which is slidable in the cylinder 100, the periphery of this piston head being provided with transversely extending slots to provide a fluid passage of limited area between the periphery of the piston head and the inner surface of the cylinder.

A cup or washer 147 of resilient material is disposed against the front side of the piston head 146 remote from the piston 140 and a second hollow, cylindrical stem 148 has on one end an externally screw threaded boss 149 threaded into a screw threaded well or recess 150 provided in the piston head 146 and the adjacent portion of the plug 137.

At the proximal end of the boss 149 the stem 148 is provided with an annular enlargement or head 151 which bears against the forward or outer side of the cup 147 and compresses this resilient cup against the piston head 146. The stem 148 is slidably received at its opposite end in the rearward end of a second spring housing 152 and is provided with a longitudinally extending slot 153. The housing 152 is provided near its rearward end with diametrically opposed apertures and a pin 154 extends through the apertures in the housing 152 and through the slot 153 to provide a lost motion connection between the stem 148 and the housing 152.

At its end remote from the stem 148 the housing 152 is provided with an end wall 155 closing this end of the housing and a compression spring 156 is disposed in the housing between the end wall 155 and the adjacent closed end of the stem 148 to resiliently urge the stem 148 rearwardly and outwardly of the housing 152.

The housing 152 is externally screw threaded and an annular collar or piston 157 is threaded onto the housing and disposed substantially midway the length of the latter. Cups or washers 158 and 159 surround the housing 152 at the front and rear sides of the piston 157 respectively and the cup 159 is compressed against the piston 157 by a nut 160 threaded onto the housing 152 at the rearward side of the piston.

A second sleeve 161 is threaded onto the housing 152 at the forward side of the piston 157 and has on its end adjacent the piston 157 an annular enlargement or head 162 which bears against the forward side of the cup 158 and compresses this cup against the piston 157.

A piston head 163 is provided on the forward end of the second sleeve 161 remote from the second intermediate piston 157 and this piston head is provided with transversely extending, peripheral grooves providing a fluid passage of limited area between the periphery of this piston head and the inner surface of the cylinder 100.

A cup or washer 164 of resilient material is disposed against the forward side of the piston head 163, that is, the side of the piston head 163 adjacent the front end wall 101 of the cylinder, and a plate 165 bears against the forward side of this cup. A compression spring 166 corresponding to spring 67 of Figure 2, is disposed between the flap valve body 167 of the valve assembly 116 and resiliently presses the plate 165 against the cup 164. This spring also resiliently presses the valve disc or body 167 against an annular shoulder 168 provided at the inner side of the end wall 101 and assists the spring 127 in moving the entire piston assembly rearwardly in a brake releasing direction.

Stop screws 169 are threaded through tapped holes in the cylinder 100 at the rearward side of the piston head 163 and are engaged by the piston head when in its limiting position in a brake releasing direction to provide a limit stop for brake releasing movement of the piston head 163.

An elongated brake fluid reservoir 170 is provided on the cylinder 100 and apertures 171, 172, 173, 174, 175 and 176 extend through the wall of the cylinder connecting the interior of the fluid reservoir to the interior of the cylinder at spaced apart locations along the latter.

The aperture 171 connects the fluid reservoir with the space in the cylinder between the cup 164 and the front end wall 101 of the cylinder and is closed by the cup 164 when the piston assembly is moved in a brake applying direction. This aperture maintains the front wheel brake operating chamber in the cylinder filled with brake fluid. The aperture 173 connects the fluid reservoir with the space in the cylinder between the cups 147 and 159 and is closed by the cup 147 when the piston assembly is moved in a brake applying direction, this aperture maintaining the rear wheel brake actuating chamber between the cups 147 and 159 filled with hydraulic brake fluid. The aperture 175 connects the interior of the fluid reservoir with the space in the cylinder between the cups 118 and 142 and is closed by the cup 118 when the piston assembly is moved in a brake applying direction, this aperture maintaining the other rear brake actuating space filled with hydraulic brake fluid.

The aperture 172 provides a breather opening between the interior of the fluid reservoir and the space between the cup 158 and the piston head 163, the aperture 174 provides a breather opening between the interior of the fluid reservoir and the space between the cup 141 and the piston head 146 and the aperture 176 provides a breather opening between the interior of the fluid reservoir and the two ends of the double ended piston 117.

The operation of this modified master cylinder assembly is substantially as follows:

Assuming that all of the vehicle brakes are operative, when the piston assembly is moved forwardly in a brake applying direction by the actuating pin 28 in response to pressure on the foot pedal 27, pressure is built up in the front wheel brake operating space between the piston head 163 and cup 164 and the front end wall of the cylinder, forcing the fluid through the valve 116 and the fitting 115 to the front wheel brakes through the conduit assembly 23. Resistance to forward movement of the piston head 163 by the pressure in the front wheel brake operating chamber resists forward movement of the piston 157 so that the piston head 146 and cup 147 are moved toward the piston 157 to compress brake fluid in the space between the cups 147 and 159. This forces brake fluid through the valve housing 105, the flap valve assembly 107, the fitting 113 and the conduit 25 to the right-hand rear wheel brake of the vehicle.

Resistance to forward movement of the piston head 146 by compression of the brake fluid in the space between the cup 164 and the front end wall of the cylinder and in the space between the cups 147 and 159 resists forward movement of the intermediate piston 140 so that the piston head 126 forces the cup 118 toward the piston 140 and cup 142 compressing the fluid in the space between the cups 118 and 142. This forces the fluid through the valve housing 106, the flap valve 108, the conduit fitting 114 and the conduit 26 to the left-hand rear wheel brake of the vehicle.

Thus, when all of the vehicle brakes are operative, all of the brakes will be applied by the brake fluid at the same pressure.

If now, one or both of both of the front wheel brakes should be inoperative and both of the rear wheel brakes operative, the piston head 163 and cup 164 will move forwardly until the annular enlargement 162 on sleeve 161 contacts the inner ends of stop screws 169. The cup 147 will then be moved toward the cup 159 compressing the spring 156 and the cup 118 will be moved toward the cup 142 compressing the spring 136 and hydraulic fluid under pressure will be applied to both of the rear wheel brakes of the vehicle.

If both rear wheel brakes should become inoperative while the front wheel brakes remain operative, the piston head 126 will be moved toward the piston 140 until pin 139 reaches the rear end of slot 138 to terminate this relative movement of the piston head 126 and piston 140 and the piston head 146 will move toward the piston 157 until pin 154 reaches the rear end of slot 153 to terminate this relative movement, whereupon piston head 163 and cup 164 will be moved toward the front wall 101 of the cylinder to apply the front wheel brakes only.

It is to be noted that the front wheel brakes are both connected together and to the space between the cup 164 and the front end of the piston so that both front wheel brakes are applied if both are operative, but neither front wheel brake is applied if one of them is inoperative.

Assuming now that both front wheel brakes and the right-hand rear wheel brake are operative, but that the left-hand rear wheel brake is inoperative, the cup 118 will move toward the cup 142 until pin 139 reaches the rear end of slot 138 to terminate this relative movement, and the remaining pistons will then operate to apply the front wheel brakes and the right-hand rear wheel brake in the manner indicated above. If the left-hand rear wheel brake should be operative and the right-hand, inoperative, the piston head 146 and cup 147 will move toward the intermediate piston 157 until pin 154 reaches the rear end of slot 153 terminating this relative movement, whereupon the remaining pistons will operate in the above indicated manner to apply the front wheel brakes and the left-hand rear wheel brake.

This modified master cylinder assembly is, therefore, effective to apply both front wheel brakes and one operative rear wheel brake, or to apply both front wheel brakes if both rear wheel brakes are inoperative or to apply both rear wheel brakes if they are operative and one or both of the front wheel brakes are inoperative. In other words, if the driver has either both front wheel brakes, both rear wheel brakes, both front wheel brakes and one rear wheel brake, or only one rear wheel brake in service, he will be able to obtain the available braking effect from whatever brake or brakes are in service at the time the brakes are applied, even though one or more of the brakes are out of service at that time.

In the signal arrangement illustrated in Figure 1, three signal lamps 180, 181 and 182 are mounted in a position at which they are readily visible to the vehicle operator, for example on the dash or instrument panel of the vehicle, and three pressure operated switches 183, 184 and 185 are mounted in apertures provided in the cylinder 100. One of the switches is subject to the fluid pressure in the space between the front end wall of the cylinder and the front piston head 163, the other is subject to the pressure in the space between the piston head 146 and the intermediate piston 157 and the other is subject to the pressure in the space between the front piston head 126 of the double ended piston 117 and the adjacent intermediate piston 140. One side of each of the lamps 180, 181 and 182 is connected by a conduit 186 to one side of the storage battery 187, the other side of which is grounded, and one side of each of the pressure switches 183, 184 and 185 is also grounded. Conduits 188, 189 and 190 connect the ungrounded sides of the switches 183, 184 and 185 to the lamps 180, 181 and 182 respectively so that these lamps will be illuminated when the corresponding pressure switches are subjected to brake fluid pressure in the master cylinder. If no pressure is built up in one of the brake operating chambers by reason of a defective brake, the corresponding lamp will fail to light up and this failure of the lamp to light up will indicate which of the brakes is defective. One or more stop lamps 191 are mounted on the rear of the vehicle and have one side grounded while the other side is connected by a conductor 192 to one of the signal lamp conductors, for example, the conductor 190.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a brake master cylinder, a single elongated hollow cylinder having an open end and a closed end, a front brake line fitting on and traversing said closed end, a rear brake line fitting communicating with the interior of said cylinder at a point between the ends of the cylinder, a first slidable piston in said cylinder at the open end thereof having fixed and spaced heads, actuating means extending through the open end of the cylinder and engaging said first piston, said actuating means being adapted to be connected to a brake pedal, a slidable second piston in the cylinder between said first piston and the closed end of the cylinder, a third slidable piston in the cylinder between said second piston and the closed end of the cylinder, a fluid reservoir on the cylinder, a first port providing communication between said reservoir and the interior of the cylinder in the region of said first piston, first spring means acting between said cylinder and said first piston and normally retracting said first piston to a starting position at the open end of the cylinder wherein said first port communicates with the space between the heads of said first piston, a second port providing communication between the reservoir and the interior of the cylinder in the region of said second piston, said first, second, and third pistons being spaced apart, said second port normally communicating with the interior of the cylinder at a point between said first and second pistons, a third port providing communication between the reservoir and the interior of the cylinder in the region of said third piston, said third port normally communicating with the interior of the cylinder between said second and third pistons, check valve means controlling movement of fluid through said front and rear brake line fittings, second spring means acting between said closed end of the cylinder and said third piston and normally positioning said third piston away from said closed end in a starting position, said second piston comprising an axial tubular housing and said first piston having an axial boss slidably engaged in said housing, and third spring means within said housing and engaging said boss and serving to resiliently transmit motion between said first and second pistons whenever either one or both of first and second pistons are moved in the cylinder relative to each other.

2. In a brake master cylinder, a single elongated tubular cylinder having a continuous and substantially unobstructed bore, said cylinder having a closed end and an open end, a first slidable piston in the cylinder at the open end thereof, a second piston assembly in the cylinder at the inward end of said first piston, a third slidable piston in the cylinder between the closed end of the cylinder and said second piston assembly, said first, second, and third pistons being spaced from each other and the cylinder being devoid of abutments engageable by the pistons in operated positions of the pistons, actuating means associated with said first piston for moving said first piston toward the second piston assembly from a starting position, said first piston having a reduced diameter axial boss on the axial inward end of said first piston, said boss being hollow and having means communicating with the interior of the cylinder while said first piston is in its starting position, said second piston assembly comprising an imperforate tubular housing slidably surrounding said boss, and means securing said housing to said third piston.

3. In a brake master cylinder, a single elongated tubular cylinder having a continuous and substantially unobstructed bore, said cylinder having a closed end and an open end, a first slidable piston in the cylinder at the open end thereof, a second piston assembly in the cylinder at the inward end of said first piston, a third slidable piston in the cylinder between the closed end of the cylinder and said second piston assembly, said first, second, and third pistons being spaced from each other and the cylinder being devoid of abutments engageable by the pistons in operated positions of the pistons, actuating means associated with said first piston for moving said first piston toward the second piston assembly from a starting position, said first piston having a reduced diameter axial boss on the axial inward end of said first piston, said boss being hollow and having means communicating with the interior of the cylinder while said first piston is in its starting position, said second piston assembly comprising an imperforate tubular housing slidably surrounding said boss, and means securing said housing to said third piston, said securing means comprising a sleeve having one end fixedly secured to said third piston and surrounding and removably secured to said housing.

4. In a brake master cylinder, a single elongated tubular cylinder having a continuous and substantially unobstructed bore, said cylinder having a closed end and an open end, a first slidable piston in the cylinder at the open end thereof, a second piston assembly in the cylinder at the inward end of said first piston, a third slidable piston in the cylinder between the closed end of the cylinder and said second piston assembly, said first, second, and third pistons being spaced from each other and the cylinder being devoid of abutments engageable by the pistons in operated positions of the pistons, actuating means associated with said first piston for moving said first piston toward the second piston assembly from a starting position, said first piston having a reduced diameter axial boss on the axial inward end of said first piston, said boss being hollow and having openings communicating with the interior of the cylinder while said first piston is in its starting position, said second piston assembly comprising an imperforate tubular housing slidably surrounding said boss, and means securing said housing to said third piston, said securing means comprising a sleeve having one end fixedly secured to said third piston and surrounding and removably secured to said housing.

References Cited in the file of this patent
UNITED STATES PATENTS

| | | |
|---|---|---|
| 1,770,064 | Carroll | July 8, 1930 |
| 1,847,402 | Loughead | Mar. 1, 1932 |
| 1,889,857 | Gardner | Dec. 6, 1932 |
| 2,074,416 | Oliver | Mar. 23, 1937 |
| 2,152,074 | McInnerney | Mar. 28, 1939 |
| 2,157,733 | Sessions | May 9, 1939 |
| 2,174,615 | Bowen et al. | Oct. 3, 1939 |
| 2,188,913 | Masteller | Feb. 6, 1940 |
| 2,563,168 | Herriott | Aug. 7, 1951 |
| 2,583,825 | Felt | Jan. 29, 1952 |
| 2,674,352 | Braun, Sr. | Apr. 6, 1954 |